(No Model.)

R. DICK.
INSOLE FOR BOOTS OR SHOES.

No. 354,693. Patented Dec. 21, 1886.

Witnesses:
James F. Tobin
William A. Davis

Inventor:
Robert Dick
by his Attorneys,
Howson and Sons

UNITED STATES PATENT OFFICE.

ROBERT DICK, OF GLASGOW, COUNTY OF LANARK, SCOTLAND.

INSOLE FOR BOOTS OR SHOES.

SPECIFICATION forming part of Letters Patent No. 354,693, dated December 21, 1886.

Application filed December 30, 1885. Serial No. 187,136. (No model.) Patented in England March 10, 1885, No. 3,116.

*To all whom it may concern:*

Be it known that I, ROBERT DICK, of Glasgow, county of Lanark, Scotland, and a subject of the Queen of Great Britain and Ireland, have invented certain Improvements in the Manufacture of Loose Soles for Boots and Shoes, (for which I have obtained a British Patent, No. 3,116, dated March 10, 1885,) of which the following is a specification.

The object of my invention is to improve the manufacture and construction of internal loose soles for boots and shoes, and this object I attain in the manner which I will now proceed to describe.

Figure 1:
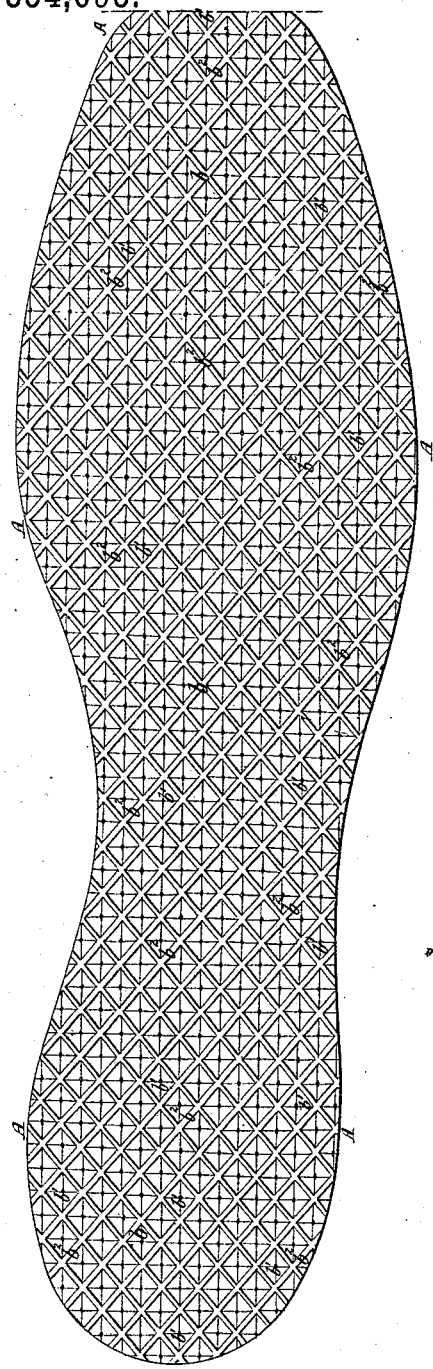
Figure 2:
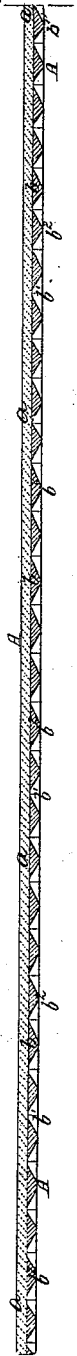

In the accompanying drawings, Figure 1 is a view of the under side of my improved loose sole, and Fig. 2 is a longitudinal section of the same with the under side turned down.

My improved loose sole comprises an upper layer of cloth or thin felt, $a$, and an under layer of elastic pliable material, $b$, composed of a mixture of gutta-percha and rubber, prepared and molded as hereinafter described. An upper thickness of thin leather may, if desired, be added, to be next the foot of the wearer.

The improved internal sole is formed or prepared as follows: The under layer of elastic pliable material $b$ is formed by heating together gutta-percha with ground or powdered old vulcanized india-rubber, and this layer is united to the upper layer of cloth by pressure in a metal mold, which at the same time gives the desired shape to the layer of rubber and gutta-percha. The surface of this mold is corrugated or deeply scored or cut in transverse or diagonal lines of a V shape, so that the sides of the ridges or the corrugations form sharp points, which penetrate and pierce or perforate the gutta-percha and rubber compound layer in hollow squares or diamonds, as shown at $b'$, and provide for the complete ventilation through the felt, while the bottoms of the grooves of the mold form diagonal ridges $b^2$, for the lower surface, $b$, of the sole to rest on and sustain the pressure of the foot, and yet be quite open between. The felt is thus united to the under layer, and the latter molded into shape at one and the same operation while the gutta-percha mixture is hot and plastic. The composite fabric $a\ b$ thus formed, with the under layer, $b$, having diagonal or crossing bearing-ridges, forming perforated hollow angled squares to permit the passage through it of moisture arising from the perspiration of the feet, is afterward cut to the desired form of internal sole to fit a boot or shoe of any size or shape in an ordinary manner.

When the sole is to be formed with a thickness of thin leather attached to the upper layer, $a$, to be next the foot of the wearer, the leather is made to the shape and size desired, with a small margin all round, or a little larger than the cloth or felt $a$ below it, and coated all round this at the edges with gutta-percha solution. This leather shape is laid over the cloth or felt cut shape or layer $a$ onto the under layer of the mixed gutta-percha and rubber $b$ upon the cross-indented and pointed surface of the metal mold, with a flat pressing block or mold above, and all compressed while hot, to attach completely the whole three plies together. When preferred, however, the leather may be stitched around the edge, or have a few cross-rows of stitching to retain it in the center to the under layers of the sole.

I claim as my invention—

That improvement in the art of manufacturing insoles for boots or shoes which consists in uniting a layer of gutta-percha compound to a layer of suitable fabric by molding, corrugating the outer surface of the gutta-percha, and perforating the same while under molding pressure, all substantially as described.

In testimony whereof I have signed my name to this specification in the presence of two subscribing witnesses.

ROBERT DICK.

Witnesses:
 WILLIAM MCKENZIE,
  *96 Buchanan Street.*
 CHAS. HATVELL.